United States Patent
Kuo et al.

(10) Patent No.: US 10,101,757 B2
(45) Date of Patent: Oct. 16, 2018

(54) INTELLIGENT CONTROL METHOD AND DEVICE

(71) Applicant: COOLER MASTER CO., LTD., New Taipei (TW)

(72) Inventors: Chu-Yi Kuo, New Taipei (TW); Chung-Yang Chen, New Taipei (TW)

(73) Assignee: Cooler Master Co., Ltd., New Taipei (TW)

(*) Notice: Subject to any disclaimer, the term of this patent is extended or adjusted under 35 U.S.C. 154(b) by 49 days.

(21) Appl. No.: 15/379,497

(22) Filed: Dec. 15, 2016

(65) Prior Publication Data

US 2017/0205838 A1   Jul. 20, 2017

Related U.S. Application Data

(60) Provisional application No. 62/278,964, filed on Jan. 14, 2016.

(51) Int. Cl.
| | | |
|---|---|---|
| *G05B 15/02* | (2006.01) | |
| *G06F 19/00* | (2018.01) | |
| *G05D 23/19* | (2006.01) | |
| *F28F 27/00* | (2006.01) | |
| *G06F 1/20* | (2006.01) | |

(52) U.S. Cl.
CPC ......... *G05D 23/1917* (2013.01); *F28F 27/00* (2013.01); *G06F 1/206* (2013.01); *F28F 2250/08* (2013.01); *F28F 2265/16* (2013.01); *G06F 2200/201* (2013.01)

(58) Field of Classification Search
CPC ....... G05B 13/021; G05B 15/02; G06F 1/206; G06F 19/00
USPC .................................................. 700/291, 300
See application file for complete search history.

(56) References Cited

U.S. PATENT DOCUMENTS

| | | | |
|---|---|---|---|
| 2008/0104111 A1 | 5/2008 | Slaney | |
| 2011/0232889 A1 | 9/2011 | Eckberg | |
| 2014/0218858 A1 | 8/2014 | Shelnutt | |
| 2014/0321050 A1 | 10/2014 | Sato | |
| 2015/0005949 A1* | 1/2015 | Haridass | G06F 1/206 700/275 |
| 2015/0261901 A1 | 9/2015 | Maitra | |
| 2017/0082112 A1* | 3/2017 | Barron | F04D 27/004 |

FOREIGN PATENT DOCUMENTS

TW    I312055    7/2009

* cited by examiner

*Primary Examiner* — Michael J Brown
(74) *Attorney, Agent, or Firm* — Alan D. Kamrath; Kamrath IP Lawfirm, P.A.

(57) ABSTRACT

An intelligent control method and an intelligent control device are adapted to be used in a heat-dissipating system. The intelligent control device includes at least a set of sensors and a micro-controller. The intelligent control method includes steps of obtaining a set of first state parameters and a set of second state parameters by sensing the heat-dissipating system at a first time point and a second time point, respectively; analyzing the set of first state parameters and the set of second state parameters to acquire an optimized heat-dissipating strategy, to generate at least a set of first control parameters; and adjusting a heat-dissipating action of the heat-dissipating system according to the set of first control parameters.

6 Claims, 5 Drawing Sheets

INTELLIGENT CONTROL METHOD AND DEVICE

CROSS REFERENCE TO RELATED APPLICATIONS

This application claims the benefit of U.S. Provisional Application No. 62/278,964, which was filed on Jan. 14, 2016, and is incorporated herein by reference.

BACKGROUND OF THE INVENTION

1. Field of the Invention

The invention relates to an intelligent control method and an intelligent control device and, more particularly, to an intelligent control method and an intelligent control device adapted to be used in a heat-dissipating system.

2. Description of the Prior Art

As technology of semiconductor circuit chips advanced, the processing speed of a controller gets faster and faster. At the same time, the chip generates more and more heat during operation. To enhance operation efficiency of the chip, a conventional electronic system utilizes a fan to dissipate heat from the chip. Since the temperature of the chip increases as time goes by, the conventional system adjusts the fan speed according to an operating temperature of the chip, to dissipate heat from the chip during operation in real time.

However, an air-cooling system using the fan to dissipate heat has some limitations. Since an operating frequency of the circuit chip gets higher and higher, the air-cooling system cannot satisfy heat-dissipating demands gradually. Accordingly, some users may install a water-cooling system in the electronic system to dissipate heat. In general, the water-cooling block, contacts a heat source, and the fan is disposed on the radiator. A cooling liquid flowing into the water-cooling block is heated by the heat source and the pump can guide the heated cooling liquid from the water-cooling block to the radiator. At this time, the fan can dissipate heat from the radiator, to cool the cooling liquid. Then, the cooling liquid flows back to the water-cooling block through a tube.

However, as mentioned above, the heat source will generate more and more heat as time goes by. In the conventional system, the fan speed may be adjusted according to the temperature of the heat source only. Once the fan speed achieves a specific range, the heat-dissipating efficiency may decrease, such that the predetermined heat-dissipating effect cannot be achieved. Therefore, how to enhance the heat-dissipating effect of the water-cooling system becomes a significant issue so far.

SUMMARY OF THE INVENTION

Therefore, an objective of the invention is to provide an intelligent control method and an intelligent control device with an optimized heat-dissipating capability and a self-diagnostic function, to improve the shortcomings of the conventional water-cooling module.

According to an embodiment of the invention, an intelligent control method is adapted to be used in a heat-dissipating system. The intelligent control method comprises steps of obtaining a set of first state parameters and a set of second state parameters by sensing the heat-dissipating system at a first time point and a second time point, respectively; analyzing the set of first state parameters and the set of second state parameters to acquire an optimized heat-dissipating strategy, to generate at least a set of first control parameters; and adjusting a heat-dissipating action of the heat-dissipating system according to the set of first control parameters.

In this embodiment, the optimized heat-dissipating strategy further generates at least a set of second control parameters, and the heat-dissipating system comprises a heat-dissipating fan and a pump. The set of first state parameters and the set of second state parameters comprise a first temperature data and a second temperature data, respectively. The set of first control parameters and the set of second control parameters are generated according to the first temperature data, the second temperature data and a data look-up table. The set of first control parameters comprise a first fan speed and a first pump speed. The set of second control parameters comprise a second fan speed and a second pump speed, and the data look-up table is downloaded from a cloud server.

In this embodiment, the heat-dissipating system further comprises a tank, and the set of first state parameters and the set of second state parameters further comprise a first liquid level height data and a second liquid level height data, respectively. The intelligent control method comprises steps of generating a request message to the cloud server when the second liquid level height data or the first liquid level height data is smaller than a predetermined value. The cloud server sends out a replacement notice, an advertisement information and an order information of related products to a user according to the request message.

In this embodiment, the intelligent control method further comprises steps of determining that a liquid leaking event occurs when a variation between the first liquid level height data and the second liquid level height data is larger than a threshold; sending out an alarm signal to the cloud server; and transmitting a message by the cloud server to a user registered account.

In this embodiment, the set of first state parameters further comprises a third temperature data, and the first temperature data and the third temperature data are sensed at different positions of the heat-dissipating system.

According to another embodiment of the invention, an intelligent control device is adapted to be used in a heat-dissipating system. The intelligent control device comprises a set of sensors electrically connected to the heat-dissipating system, with the set of sensors sensing the heat-dissipating system at a first time point and a second time point to obtain a set of first state parameters and a set of second state parameters; and a micro-controller electrically connected to the set of sensors and the heat-dissipating system. The micro-controller generates a set of first control parameters according to the set of first state parameters, the set of second control parameters and an optimized heat-dissipating strategy, to adjust a heat-dissipating action of the heat-dissipating system according to the set of first control parameters.

In this embodiment, the heat-dissipating system comprises a heat-dissipating fan and a pump. The micro-controller further generates a set of second control parameters according to the set of first state parameters. The set of second control parameters, the optimized heat-dissipating strategy, the set of first state parameters and the set of second state parameters comprise a first temperature data and a second temperature data, respectively. The micro-controller generates the set of first control parameters and the set of second control parameters according to the first temperature data, the second temperature data and a data look-up table. The set of first control parameters comprise a first fan speed and a first pump speed, the set of second control parameters comprise a second fan speed and a second pump speed, and the data look-up table is stored in a memory unit of the micro-controller.

In this embodiment, the heat-dissipating system further comprises a tank. The set of first state parameters and the set of second state parameters further comprise a first liquid level height data and a second liquid level height data, respectively. The intelligent control device generates and transmits a request message to a cloud server when the second liquid level height data or the first liquid level height data is smaller than a predetermined value. The cloud server sends out a replacement notice an advertisement information and an order information of related products to a user according to the request message.

In this embodiment, the micro-controller determines that a liquid leaking event occurs when a variation between the first liquid level height data and the second liquid level height data is larger than a threshold and sends out an alarm signal to the cloud server, and the cloud server transmits a message to a user registered account .

In this embodiment, the data look-up table stored in the memory unit of the micro-controller is downloaded from a cloud server.

These and other objectives of the present invention will no doubt become obvious to those of ordinary skill in the art after reading the following detailed description of the preferred embodiments that are illustrated in the various figures and drawings.

DETAILED DESCRIPTION

Some embodiments capable of achieving characteristics and features will be depicted in detail in the following. It should be noted that numerous modifications and alterations of the device and method may be made while retaining the teachings of the invention, so the following disclosure should be construed as limited only by the metes and bounds of the appended claims. Furthermore, the description and figures are used for illustration purposes but not to limit the invention.

Figure 1:
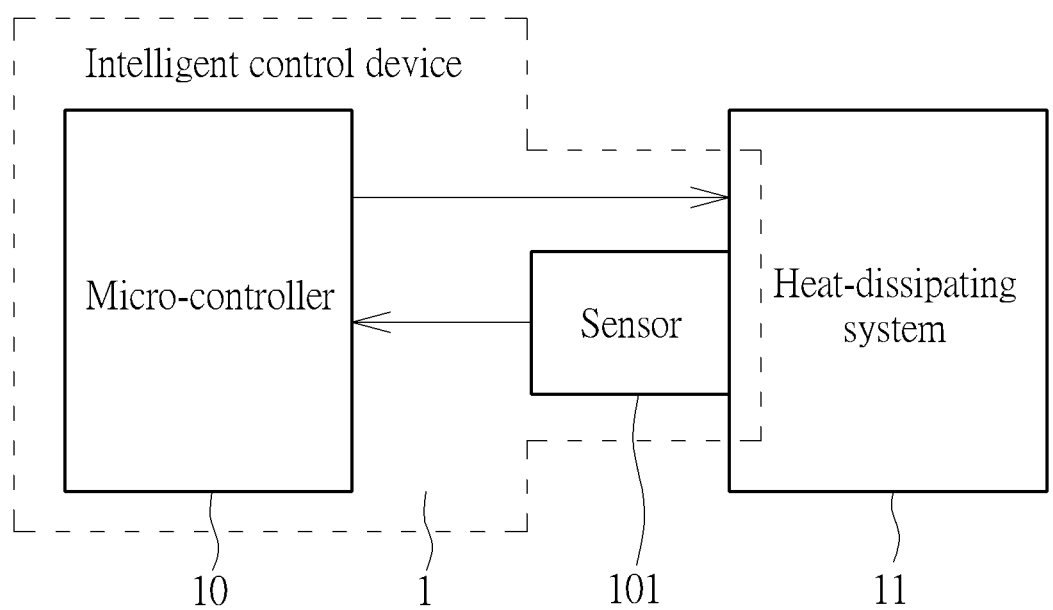
FIG. 1 is a functional block diagram illustrating an intelligent control device according to an embodiment of the invention.
Figure 2:
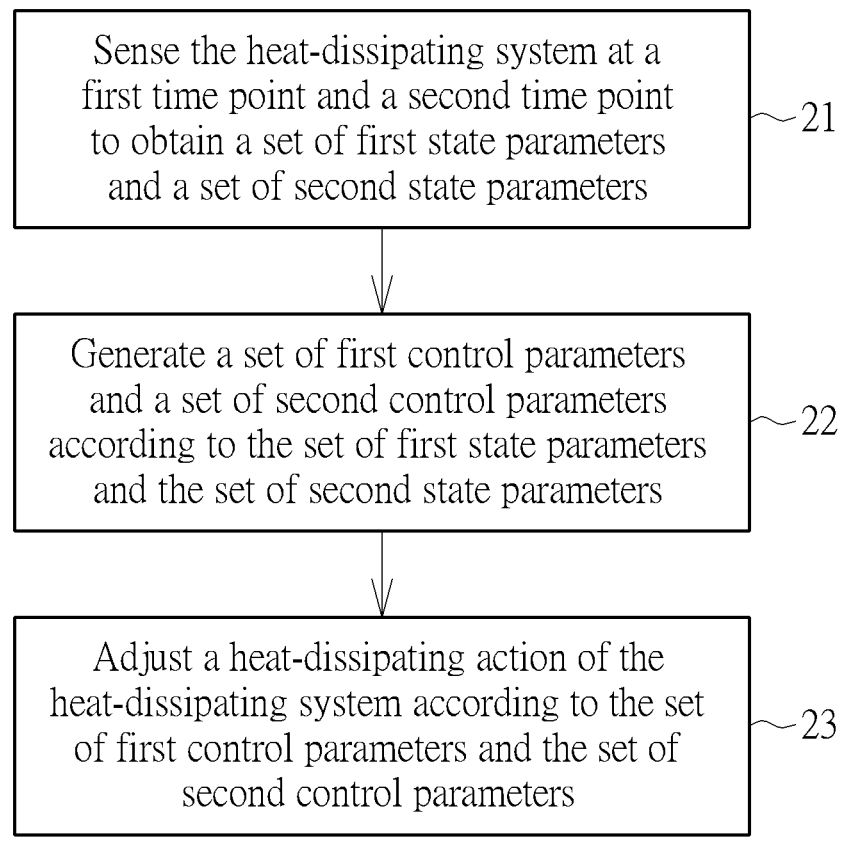
FIG. 2 is a flowchart illustrating an intelligent control method according to an embodiment of the invention.

The invention discloses an intelligent control method and an intelligent control device for controlling a heat-dissipating system. As shown in FIG. 1, the intelligent control device 1 of the invention is adapted to be used in the heat-dissipating system 11. The intelligent control device 1 comprises at least a set of sensors 101 and a micro-controller 10. The intelligent control device 1 can execute an intelligent control method shown in FIG. 2. The set of sensors 101 are electrically connected to the heat-dissipating system 11. The set of sensors 101 senses the heat-dissipating system 11 at a first time point and a second time point to obtain a set of first state parameters and a set of second state parameters. The set of first state parameters and the set of second state parameters represent operating states of the heat-dissipating system 11 (step 21). The micro-controller 10, which is electrically connected to the set of sensors 101 and the heat-dissipating system 11, generates a set of first control parameters and a set of second control parameters according to the set of first state parameters and the set of second state parameters (step 22), to adjust a heat-dissipating action of the heat-dissipating system 11 according to the set of first control parameters and the set of second control parameters (step 23). Needless to say, the invention may sense and obtain more sets of first state parameters at more time points continuously, such that the micro-controller 10 may adjust the heat-dissipating action of the heat-dissipating system 11 in real time. The state parameters of the heat-dissipating system 11 may comprise a temperature data, a temperature variation data, a liquid level height data of a cooling liquid, a liquid level height variation data of the cooling liquid, and so on. The heat-dissipating action of the heat-dissipating system 11 may be a fan speed, a pump speed, and so on.

Figure 3:
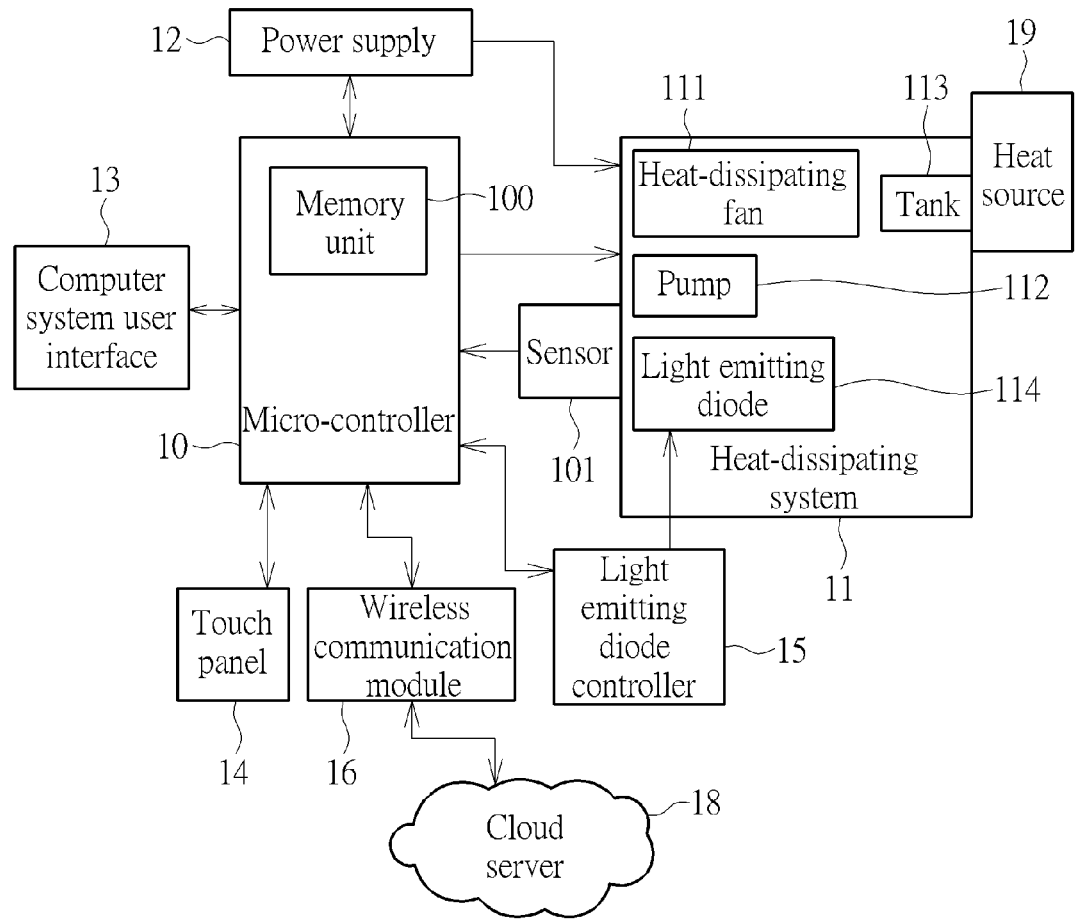
FIG. 3 is a functional block diagram illustrating the intelligent control device for executing the intelligent control method operated with peripheral devices according to an embodiment of the invention.

FIG. 3 is a functional block diagram illustrating the intelligent control device for executing the intelligent control method operated with peripheral devices according to an embodiment of the invention. The core of the intelligent control device 1 is the micro-controller 10 including a memory unit 100. The micro-controller 10 is electrically connected to the heat-dissipating system 11, a power supply 12, a computer system user interface 13, a touch panel 14, a light emitting diode display controller 15 and a wireless communication module 16. The heat-dissipating system 11 comprises a heat-dissipating fan 111, a pump 112, a tank 113 and a light emitting diode 114. The tank 113 may be adjacent to a heat source 19, which needs heat dissipation. The pump 112 is used for driving a liquid within the tank 113 to flow circularly. The heat-dissipating fan 111 is used for dissipating heat from the liquid, which flows in the tubes circularly. Furthermore, the set of sensors 101 of the intelligent control device 1 may comprise one or more temperature sensors. Therefore, the invention may dispose a plurality of temperature sensors at different positions of liquid tubes for heat dissipation, the heat dissipating fan 111, the pump 112, the tank 113, and so on, to sense and obtain a plurality of temperatures from different positions at a plurality of time points. Then, the invention may estimate a spatial distribution of temperature and a variation of temperature as time goes by, to monitor the temperature of the heat-dissipating system 11. The invention can analyze the temperature data and temperature variation data within a unit time to acquire an optimized heat-dissipating strategy, to generate at least a set of control parameters. Consequently, the invention can utilize the set of control parameters to control speeds of the heat-dissipating fan 111 and the pump 112, to adjust the heat-dissipating action of the heat-dissipating system 11 and then optimize heat-dissipating efficiency and system performance.

For example, the intelligent control method and the intelligent control device of the invention can sense a plurality of sets of state parameters, which represent operating states of the heat-dissipating system, at a plurality of time points. The sets of state parameters comprise temperature data of a plurality of different positions or different times. Needless to say, each set of state parameters may comprise one temperature data according to an embodiment. The invention can generate an optimized heat-dissipating strategy according to the temperature data and a data look-up table or an operating function stored in the memory unit 100, The optimized heat-dissipating strategy may be one or more sets of control parameters. In the sets of control parameters, the set of first control parameters may comprise a first fan speed and a first pump speed and the set of second control parameters may comprise a second fan speed and a second pump speed. Needless to say, each set of control parameters may comprise one fan speed or one pump speed according to other embodiments. Consequently, the invention can utilize the control parameters including the fan speed and the pump speed to adjust the heat-dissipating action of the heat-dissipating system. The invention may perform a plurality of sets of data on the heat-dissipating system to acquire an optimized data, to establish the data look-up table or the operating function. Accordingly, different heat-dissipating systems may correspond to different data look-up tables or operating functions. The manufacturer may update the data look-up table or the operating function in a cloud server 18 according to different heat-dissipating systems with different settings and the user can download the data look-up table or the operating function from the cloud server 18. The wireless communication module 16 is used for connecting the cloud server 18 and the micro-controller 10 with the memory unit 100 therein.

It should be noted that the aforesaid optimized heat-dissipating strategy may be implemented through a combination of proportional gain, integral gain and differential gain.

In this embodiment, the heat source 19 may be an integrated circuit, such as a central processing unit (CPU), a graphics processing unit (GPU), or a memory unit, which generates heat due to high speed operation. In another embodiment, the heat source 19 may be a computer system, a projector, or other electronic information system, which needs to adjust temperature or dissipate heat. In another embodiment, the heat source 19 may be other devices, such as a greenhouse, an aquarium, or an electric car. Furthermore, the light emitting diode 114 may be a display unit for showing various states of the heat-dissipating system 11. For example, the color of the light emitting diode 114 may be used to represent the temperature of the cooling liquid. When the temperature is high, the color may be adjusted to be yellow or red, to warn the user. The micro-controller 10 may control the color, brightness, and so on of the light emitting diode 114 through the light emitting diode display controller 15.

In the embodiment of the invention, the temperature of the heat source may be estimated by sensing the temperature of the cooling liquid in the heat-dissipating system 11. Accordingly, the set of sensors 101 including one or more temperature sensors may send back different sets of temperature data and temperature variation data associated with time sensed at different time points, to represent the temperature of the heat source 19 to a certain extent. To control the whole condition, the invention may dispose a plurality of temperature sensors at different positions of liquid tubes, the heat-dissipating fan 111, the pump 112, the tank 113, and so on, to send back temperature distribution and variation associated with time from different positions. Therefore, the micro-controller 10 of the invention can control the pump speed and the fan speed of the heat-dissipating system 11 according to the temperature data, to optimize heat-dissipating efficiency. Moreover, the invention may further adjust the output of the power supply 12, to optimize power efficiency. The power supply 12 may be a power source for the heat source of the heat-dissipating system 11.

Figure 4:
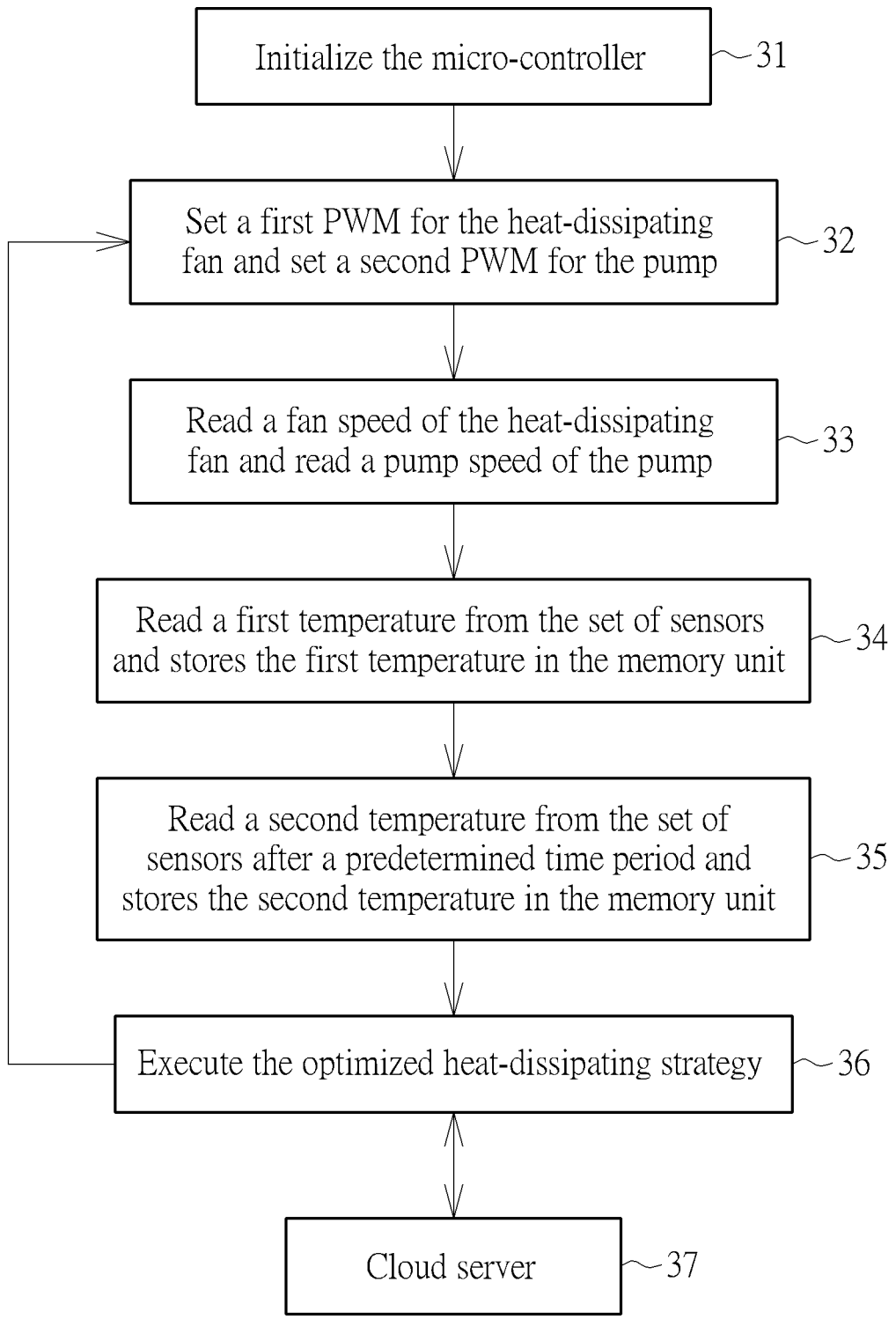
FIG. 4 is a flowchart illustrating a liquid cooling logic according to an embodiment of the invention.

Referring to FIG. 4, FIG. 4 is a flowchart illustrating a liquid cooling logic according to an embodiment of the invention. In the beginning, step 31 is performed to initialize the micro-controller 10. Then, the micro-controller 10 sets a first pulse width modulation (PWM) for the heat-dissipating fan 111 and sest a second PWM for the pump 112 (step 32). The first PWM and the second PWM may be default. Then, the micro-controller 10 reads a fan speed of the heat-dissipating fan 111 and reads a pump speed of the pump 112 (step 33). Then, the micro-controller 10 reads a first temperature from the set of sensors 101 and stores the first temperature in the memory unit 100 (step 34). Then, the micro-controller 10 reads a second temperature from the set of sensors 101 after a predetermined time period (e.g. 5 seconds) and stores the second temperature in the memory unit 100 (step 35). Then, the micro-controller 10 executes the aforesaid optimized heat-dissipating strategy (step 36) to reset the first PWM for the heat-dissipating fan 111 and reset the second PWM for the pump 112 according to the temperature data stored in the memory unit 100, to adjust the heat-dissipating action of the heat-dissipating system 11. As mentioned above, the micro-controller 10 may download the optimized heat-dissipating strategy from the cloud server 18 through the wireless communication module 16 (step 37).

Still further, the set of sensors 101 of the invention may comprise a liquid level sensor disposed on the tank 113 or other possible positions.The liquid level sensor is used for sensing the level of the cooling liquid in the tank 113 of the heat-dissipating system 11 for control purposes. Accordingly, the state parameters may comprise a liquid level height data. The tank 113 is used for containing the cooling liquid and providing the cooling liquid to the heat-dissipating system 11. Once the liquid level height is smaller than a predetermined value, the micro-controller 10 may send out a request message to the cloud server 18. Accordingly, the ,manufacturer may send out a replacement notice an advertisement information and an order information of related products to the user according to the request message, to market a new tank for the user. Furthermore, the micro-controller 10 of the invention may determine whether a liquid leaking event occurs according to a liquid level height variation, e.g. the reduced liquid level height within a unit time is larger than a threshold. When determining that the liquid leaking event occurs, the micro-controller 10 may send out an alarm signal to the cloud server 18 through the wireless communication module 16, and the cloud server 18 may transmit a phone message or an e-mail to a user registered account. When the second liquid level height data or the first liquid level height data is smaller than a predetermined value, the invention generates and transmits a request message to a cloud server. Then, the cloud server sends out a replacement notice, an advertisement information and an order information of related products to a user according to the request message.

Figure 5:
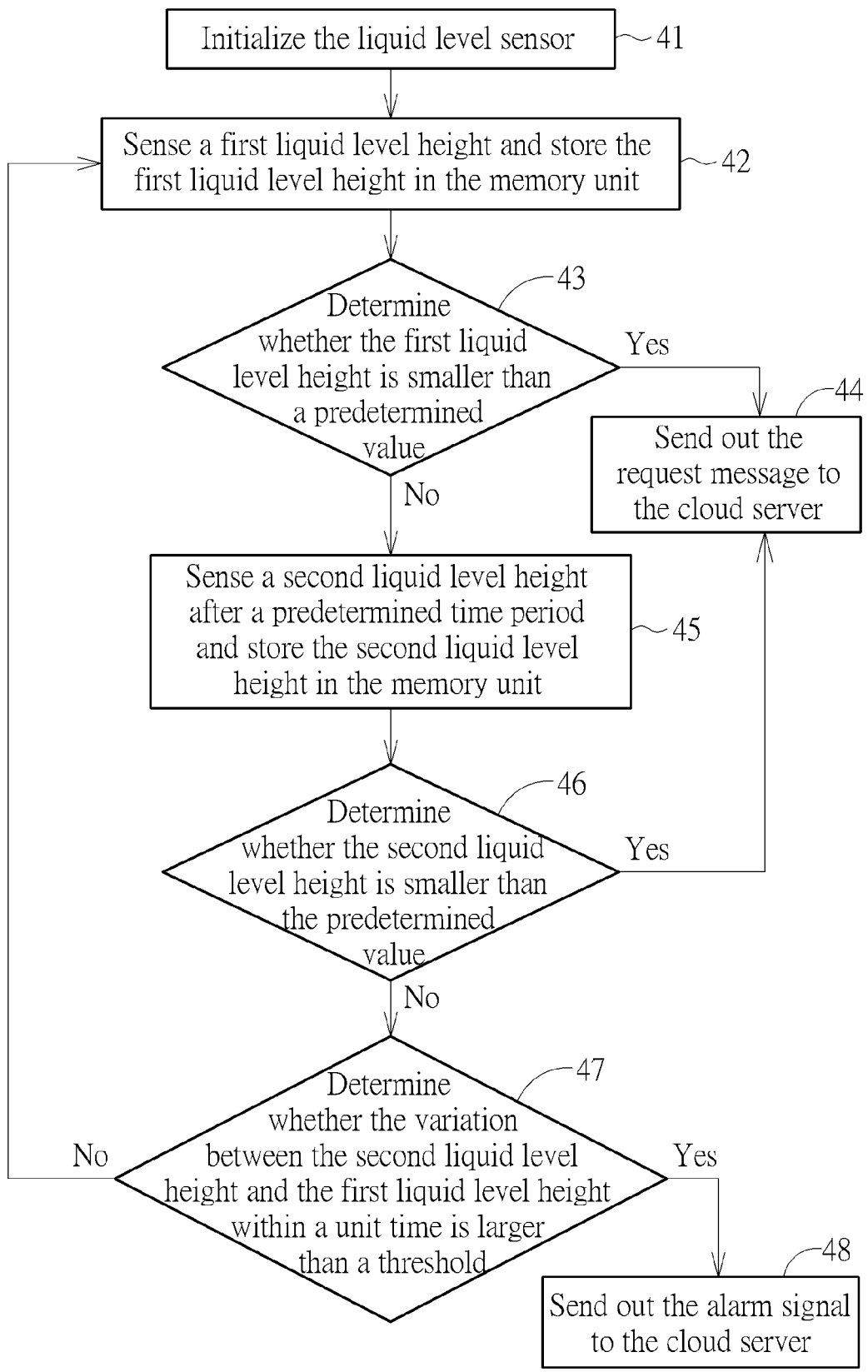
FIG. 5 is a flowchart illustrating a liquid level sensing logic according to an embodiment of the invention.

Referring to FIG. 5, FIG. 5 is a flowchart illustrating a liquid level sensing logic according to an embodiment of the invention. In the beginning, step 41 is performed to initialize the liquid level sensor of the set of sensors 101. Then, the liquid level sensor senses a first liquid level height, and the micro-controller 10 stores the first liquid level height in the memory unit 100 (step 42). Then, the micro-controller 10 determines whether the first liquid level height is smaller than a predetermined value (step 43). If the first liquid level height is smaller than the predetermined value, the micro-controller 10 sends out the aforesaid request message to the cloud server 18 (step 44). If the first liquid level height is not smaller than the predetermined value, the liquid level sensor senses a second liquid level height after a predetermined time period (e.g. 1 second), and the micro-controller 10 stores the second liquid level height in the memory unit 100 (step 45). Then, the micro-controller 10 determines whether the second liquid level height is smaller than the predetermined value (step 46). If the second liquid level height is smaller than the predetermined value, the micro-controller 10 sends out the aforesaid request message to the cloud server 18 (step 44). If the second liquid level height is not smaller than the predetermined value, the micro-controller 10 determines whether the variation between the second liquid level height and the first liquid level height within a unit time is larger than a threshold (step 47). If the variation between the second liquid level height and the first liquid level height within a unit time is larger than the threshold, the micro-controller 10 sends out the aforesaid alarm signal to the cloud server 18 (step 48). If the variation between the second liquid level height and the first liquid level height within a unit time is not larger than the threshold, go back to step 42.

Moreover, the user may login the cloud server by the user registered account, and the cloud server may provide a menu interface for the user when the user logins. Through the menu interface, the user may use the computer system user interface 13 or the touch panel 14 to decide how to warn the user, e.g. the aforesaid phone message or e-mail. Needless to say, the content of the menu interface may comprise an option of the aforesaid request message, such that the user may select to trigger the cloud server 18 to send out a message of adding the cooling liquid, a notice of replacing the tank, and/or an advertisement information and an order information of related products of the tank to the user. Therefore, the user may use a smart phone, a tablet computer, a personal computer, and so onto communicate with the cloud server 18, to set the aforesaid menu interface and an operating mode or needed parameters of the micro-controller 10. In addition, the intelligent control method of the invention may be implemented by a software executed in the system or a firmware stored in a control chip installed in the system casing or the micro-controller. The system may be a computer system, a projector, or other electronic information system, which needs to dissipate heat.

In this embodiment, the heat source 19 may be an integrated circuit, such as a central processing unit (CPU), a graphics processing unit (GPU), or a random access memory (RAM), which generates heat due to high speed operation. In another embodiment, the heat source 19 may be a computer system, a projector, or other electronic information system, which needs to adjust temperature or dissipate heat. In another embodiment, the heat source 19 may be other devices such as a greenhouse, an aquarium, or an electric car. In various embodiments, the micro-controller 10 and the set of sensors 101 for executing the intelligent control method of the invention may be disposed in a casing of the heat-dissipating system 11. Furthermore, the intelligent control method may be executed by a heat-dissipating control box equipped with the micro-controller 10, and the heat-dissipating control box is disposed outside the computer system. The memory unit 100 of the micro-controller 10 may record an operating action of the user. For example, the temperature variation data of the heat source may be recorded in the memory unit 100. Accordingly, the heat-dissipating control box may execute a predetermined optimized heat-dissipating strategy according to the temperature variation data recorded in the memory unit, to control the pump speed and the fan speed. The predetermined optimized heat-dissipating strategy may be modified and adjusted by the user. Needless to say, the user may login the cloud server to select and download a suitable optimized heat-dissipating strategy to the heat-dissipating control box.

The aforesaid heat-dissipating control box may be sold to a consumer individually, and the consumer may assemble the heat-dissipating control box with a computer himself/ herself. Furthermore, the heat-dissipating control box may be assembled and sold with a water-cooling system. Still further, the heat-dissipating control box may be assembled with a computer casing to form an assembled frame device and then sold to the consumer. Through the assembled frame device with the heat-dissipating control box of the invention, it can send out a control signal to control the action of the heat-dissipating system according to the data sensed by the computer system. As mentioned above, the invention can solve the problems of the prior art, which cannot optimize heat-dissipating and power efficiency. Furthermore, the invention may be applied to a computer system, a projector, or other electronic information system, which needs to adjust temperature or dissipate heat. Still further, the invention may be applied to other devices such as a greenhouse, an aquarium, or an electric car.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent control method adapted to be used in a heat-dissipating system, with the intelligent control method comprising:
    obtaining a set of first state parameters and a set of second state parameters by sensing the heat-dissipating system at a first time point and a second time point, respectively;
    analyzing the set of first state parameters and the set of second state parameters to acquire an optimized heat-dissipating strategy, so as to generate at least a set of first control parameters;
    adjusting a heat-dissipating action of the heat-dissipating system according to the set of first control parameters, wherein the optimized heat-dissipating strategy further generates at least a set of second control parameters, wherein the heat-dissipating system comprises a heat-dissipating fan, a pump and a tank, wherein the set of first state parameters and the set of second state parameters comprise a first temperature data and a second temperature data, respectively, wherein the set of first control parameters and the set of second control parameters are generated according to the first temperature data, the second temperature data and a data look-up table, wherein the set of first control parameters comprises a first fan speed and a first pump speed, wherein the set of second control parameters comprises a second fan speed and a second pump speed, wherein the data look-up table is downloaded from a cloud server, wherein the set of first state parameters and the set of second state parameters further comprise a first liquid level height data and a second liquid level height data, respectively;
    generating a request message to the cloud server when the second liquid level height data or the first liquid level height data is smaller than a predetermined value; and sending out a replacement notice, an advertisement information and an order information of related products to a user by the cloud server according to the request message.

2. The intelligent control method of claim 1, further comprising:
   determining that a liquid leaking event occurs when a variation between the first liquid level height data and the second liquid level height data is larger than a threshold;
   sending out an alarm signal to the cloud server; and
   transmitting a message to a user registered account by the cloud server.

3. The intelligent control method of claim 1, wherein the set of first state parameters further comprise a third temperature data, and wherein the first temperature data and the third temperature data are sensed at different positions of the heat-dissipating system.

4. An intelligent control device comprising:
   a set of sensors electrically connected to the heat-dissipating system, with the set of sensors sensing the heat-dissipating system at a first time point and a second time point to obtain a set of first state parameters and a set of second state parameters;
   a micro-controller electrically connected to the set of sensors and the heat-dissipating system, with the micro-controller generating a set of first control parameters according to the set of first state parameters, the set of second state parameters and an optimized heat-dissipating strategy, to adjust a heat-dissipating action of the heat-dissipating system according to the set of first control parameters; and
   a heat-dissipating system comprising a heat-dissipating fan, a pump, and a tank, wherein the micro-controller further generates a set of second control parameters according to the set of first state parameters, the set of second state parameters and the optimized heat-dissipating strategy, wherein the set of first state parameters and the set of second state parameters comprise a first temperature data and a second temperature data, respectively, wherein the micro-controller generates the set of first control parameters and the set of second control parameters according to the first temperature data, the second temperature data and a data look-up table, wherein the set of first control parameters comprises a first fan speed and a first pump speed, wherein the set of second control parameters comprises a second fan speed and a second pump speed, wherein the data look-up table is stored in a memory unit of the micro-controller, wherein the set of first state parameters and the set of second state parameters further comprise a first liquid level height data and a second liquid level height data, respectively, wherein the intelligent control device generates and transmits a request message to a cloud server when the second liquid level height data or the first liquid level height data is smaller than a predetermined value, and wherein the cloud server sends out a replacement notice, an advertisement information and an order information of related products to a user according to the request message.

5. The intelligent control device of claim 4, wherein the micro-controller determines that a liquid leaking event occurs when a variation between the first liquid level height data and the second liquid level height data is larger than a threshold and sends out an alarm signal to the cloud server, and wherein the cloud server transmits a message to a user registered account.

6. The intelligent control device of claim 4, wherein the data look-up table stored in the memory unit of the micro-controller is downloaded from a cloud server.

* * * * *